United States Patent [19]

Magenheim

[11] 3,896,382

[45] July 22, 1975

[54] PRECIPITATION ATTENUATION DETECTION SYSTEM

[75] Inventor: Bertram Magenheim, Bethesda, Md.

[73] Assignee: Communications Satellite Corporation, Washington, D.C.

[22] Filed: Nov. 17, 1972

[21] Appl. No.: 307,725

[52] U.S. Cl. ....................... 325/56; 325/4; 325/302; 343/5 W

[51] Int. Cl. ............................................. H04b 7/02

[58] Field of Search ............... 325/4, 15, 51, 52, 53, 325/55, 56, 63, 65, 67, 301–303; 343/5 W, 200, 175, 228, 100 CS, 100 ME; 73/170 R; 250/199

[56] References Cited

UNITED STATES PATENTS

| | | | |
|---|---|---|---|
| 2,956,277 | 10/1960 | Crawford | 325/15 |
| 3,174,150 | 3/1965 | Sferrazza et al. | 325/15 |
| 3,262,116 | 7/1966 | Hutchinson | 325/56 |
| 3,475,686 | 10/1969 | Holt, Jr. et al. | 325/56 |
| 3,482,165 | 12/1969 | Leming | 325/56 |
| 3,676,778 | 7/1972 | Mori | 325/4 |

*Primary Examiner*—Benedict V. Safourek
*Assistant Examiner*—Jin F. Ng
*Attorney, Agent, or Firm*—Sughrue, Rothwell, Mion, Zinn & Macpeak

[57] ABSTRACT

A precipitation attenuation detection system in a satellite communication system for detecting the approach of rain cells which will cause attenuation of the communications signals passing between the satellite and an earth station over a communications path and for causing the communications signals between the earth station and the satellite to be switched to another communications path outside the influence of the rain cells in response to the detection of impending rain.

6 Claims, 4 Drawing Figures

PRECIPITATION ATTENUATION DETECTION SYSTEM

BACKGROUND OF THE INVENTION

In satellite communications systems a plurality of earth stations communicate with each other via a satellite relay station. The transfer of communications signals between an earth station and the satellite takes place over a defined communications path termed herein the communications link. The communications signals in a communications link are subject to attenuation when rain cells intersect the communications beam carrying the communications signals over the link. Prior attempts at solving the precipitation attenuation problem revolved around monitoring the precipitation at each station and altering either the frequency of the communications signals or providing backup stations to which the communication link is switched when precipitation is detected at the primary station. An example of such a monitoring system is disclosed in U.S. Pat. No. 3,676,778 to Mori issued July 11, 1972. A problem with the Mori system is that before precipitation can be measured, it must reach the earth station. Since the precipitation measuring system measures precipitation which has already reached the earth station, switching to another frequency or to a backup station generally does not occur until after the communications link has been severed due to precipitation attenuation.

SUMMARY OF THE INVENTION

It is an object of this invention to provide a system for predicting approaching attenuation of communication signals traveling over a defined communications link and for preventing attenuation by providing a redundant communications link. Only one communications link is active at any one time. The dormant link is switched to its active state to carry communications signals between the earth station and the satellite upon the detection of on-coming rain cells of sufficient intensity to attenuate the signals being carried over the active communications link. By detecting precipitation before it reaches the earth station, attenuation can be completely eliminated.

Link redundancy can be accomplished using frequency diversity wherein the frequency of the communications signals is changed upon the detection of on-coming rain cells, the new communications frequency being relatively unaffected by the rain cells, or preferably by what will be termed space diversity.

Space diversity involves spaced redundant communications links and can be accomplished by either angle diversity or spatial separation of dual communications links. With spatial separation, two communications beams are available for transmitting communications signals over separate communications paths separated from one another by a relatively large distance. The two communications beams carry the same communications signals; however, only one beam carries communications signals at any time. The two beams may be directed to either a single satellite or to different satellites. With angle diversity, the communications beams are transmitted over communications links which are located close to each other at the ground but which are angularly displaced. In this case, two satellites are used.

Again, only one communications beam is active at any time.

As rain cells approach the active communications link, beam select logic, located at the earth station, switches the communications signals to another, dormant, communications link. This other link is outside the influence of the approaching rain cells. Detection of approaching rain cells is accomplished using radiometers producing auxiliary detecting beams which effectively surround each communications link. The auxiliary detecting beam can be stationary, with a beam width wider than that of the communications beam of the communications link with which it is associated and concentric therewith. The detecting beam may also be narrower than its corresponding communications beam in which case it is made to scan the sky 360° about the communications beam.

DETAILED DESCRIPTION OF THE PREFERRED EMBODIMENTS

Figure 1:
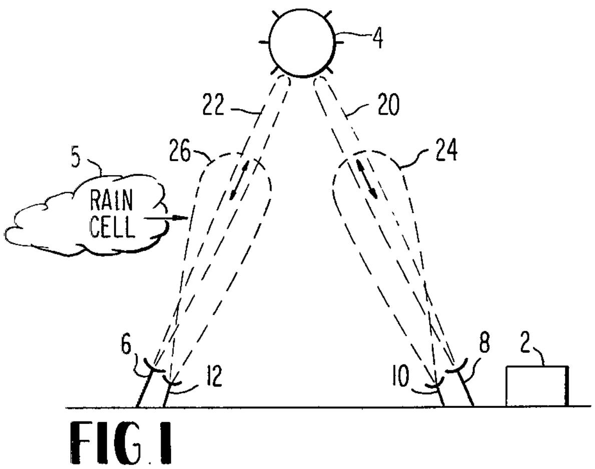
FIG. 1 represents a first embodiment of the invention wherein spatial separation diversity is used.

FIG. 1 illustrates one embodiment of the precipitation attenuation detection system and more specifically depicts the spatial separation embodiment. A conventional earth station, designated generally by block 2, is coupled to communications antennas 6 and 8. Each of these antennas represents a plurality of conventional transmitting and receiving antennas. Associated with each antenna 6, 8 is a communications beam 22, 20 which represents the plurality of beams associated with the plurality of antennas represented by the antennas 6 and 8. As can be seen from FIG. 1, the communications link between satellite 4 and antenna 6 is different from that between satellite 4 and antenna 8. A conventional radiometer, physically located at the precipitation detecting antennas 10, 12, is associated with each communications link. Detecting antennas 10, 12 generate auxiliary detecting beams 24, 26 which surround communications beams 20, 22. An auxiliary beam may be wider than the communications beams and concentric therewith, as illustrated in FIG. 1, or it may be narrower than its associated communications beam and made to scan the area thereabout. The radiometer monitors sky temperature to detect the presence of rain cells of sufficient intensity to cause precipitation attenuation. Since the auxiliary beams are effectively wider than the communications beams, they can be used to predict impending attenuation.

Communication attennas 6, 8 are separated from each other so that rain cells affecting beam 22 will not affect beam 20. Thus, as rain cells, such as rain cell 5, move in the direction of the arrow and intersect the communications beam 22, communications beam 20 remains unaffected. Communications antennas 6, 8 may be spaced, for example, approximately 5 miles apart.

These antennas 6, 8 are redundant in that only one is active at any moment. Assuming that communications antenna 6 is active, meaning that communications beam 22 carries communications signals between the satellite and earth station, as rain cell 5 is detected by detecting beam 26, beam select logic at the earth station 2 causes the switching of the communications link from communications beam 22 to communications beam 20. As rain cell 5 continues its movement in the direction indicated, a time is reached when it would no longer influence communications beam 22, but may cause attenuation of beam 20. However, auxiliary beam 24 detects the approach of rain cell 5 and triggers the beam select logic to switch the communications link from antenna 8 to antenna 6.

In FIG. 1 only a single satellite is illustrated. However, two satellites may be used with communications beam 22 directed to a first satellite while communications beam 20 is directed to another (not shown).

Figure 2:
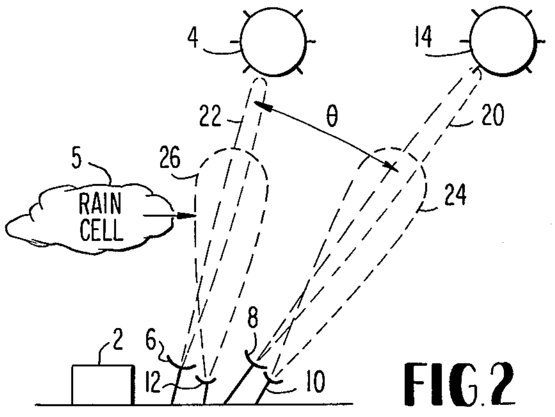
FIG. 2 represents the second embodiment of the invention wherein angular diversity is used.

FIG. 2 illustrates the angular diversity embodiment in the invention. Like elements in FIGS. 1 and 2 are designated by common numerals. Communications antennas 6, 8 are located in the same general vicinity, but generate communication beams 20 and 22 angularly displaced with respect to each other by an angle $\theta$. The operation of this embodiment is identical to that of the embodiment of FIG. 1. As rain cell 5 approaches communications beam 22, auxiliary beam 26 detects its presence and causes the beam select logic to switch the communications link from antenna 6 to antenna 8. In this embodiment two satellites 4 and 14 are utilized.

Figure 3:
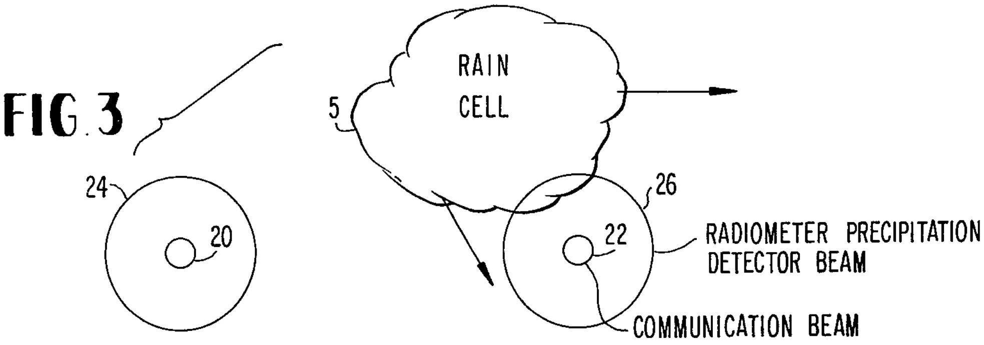
FIG. 3 is a schematic diagram of the communications and auxiliary beams traveling over two communications links as seen from the sky.

FIG. 3 represents the communications and auxiliary beam patterns in relation to an approaching rain cell as seen from the sky. As rain cell 5 intersects auxiliary beam 26, the cell moving in the direction of the arrows, the communications link is switched to thereby switch the communications signals to antenna 8.

Figure 4:
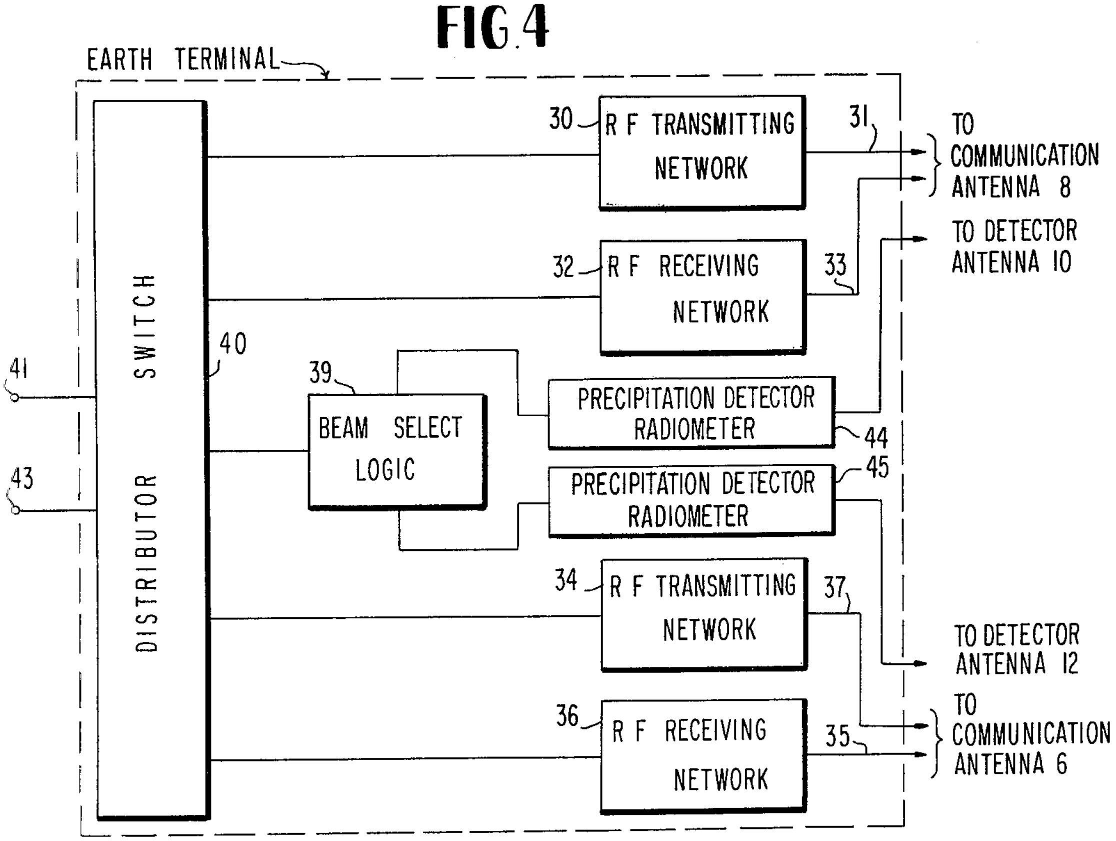
FIG. 4 represents an earth station modified in accordance with the teachings of this invention.

FIG. 4 represents a portion of a conventional earth station modified in accordance with the teachings of the present invention. Lines 31, 33, 35, and 37 represent the connection between the communications antennas 6, 8 and the earth station 2. These lines are connected to conventional RF transmitting and receiving networks 30, 32, 34, and 36. These networks are coupled to the conventional earth station circuitry through a distributor switch 40 which selectively channels communications signals either between communications lines 41 and 43 and transmitting and receiving networks 30 and 32, or between communications lines 41 and 43 and transmitting and receiving networks 34, 36. The distributor switch 40, whose function can be performed by any electronically actuated switch such as a double-pole double-throw switch, may be comprised of simple logic gates controlled by beam select logic 39 which may be a flip-flop. The state of the beam select logic is controlled by the radiometers 44 and 45, receiving signals from detecting beams 24 and 26.

While the invention has been particularly shown and described with reference to a preferred embodiment thereof, it will be understood by those skilled in the art that various changes in form and details may be made therein without departing from the spirit and scope of the invention.

I claim:

1. In a satellite communications system including a plurality of earth stations, a precipitation attenuation detection system comprising:

means associated with an earth station for generating a pair of communications beams traversing the space between the earth station and at least one satellite over separate communications links, only one of said beams being active to carry communications signals at any time, the other beam being dormant, precipitation detecting means for detecting precipitation in a region above said earth station, said region including an area which surrounds the beam width of said active communications beam, and switch means, responsive to the detection of precipitation by said detecting means, for switching the communications signals to the dormant communications beam, the beam previously carrying communications signals becoming dormant.

2. The precipitation attenuation detection system of claim 1 wherein said detecting means includes means for scanning the area about each communications beam with an auxiliary detecting beam.

3. The precipitation attenuation detection system of claim 1 wherein said detecting means includes means for producing an auxiliary detecting beam surrounding each communications beam.

4. The precipitation attenuation detection system of claim 3 wherein said means producing auxiliary beams comprises means for producing a beam wider than and concentric with its corresponding communications beam.

5. A precipitation attenuation detection system of claim 3 wherein said detecting means includes radiometer means for monitoring the sky temperature in the area around said communications beams, said sky temperature providing an indication of rain.

6. The precipitation attenuation detecting system of claim 5 wherein said switch means comprise beam select logic responsive to the radiometer means for producing a beam select signal and a distributor switch responsive to said beam select signal for switching communications signals to the communications beam not subject to attenuation by detected approaching precipitation.

* * * * *